W. F. HOLT.
TRANSPORTATION SYSTEM.
APPLICATION FILED JULY 11, 1917.
1,246,921.
Patented Nov. 20, 1917.
2 SHEETS—SHEET 2.
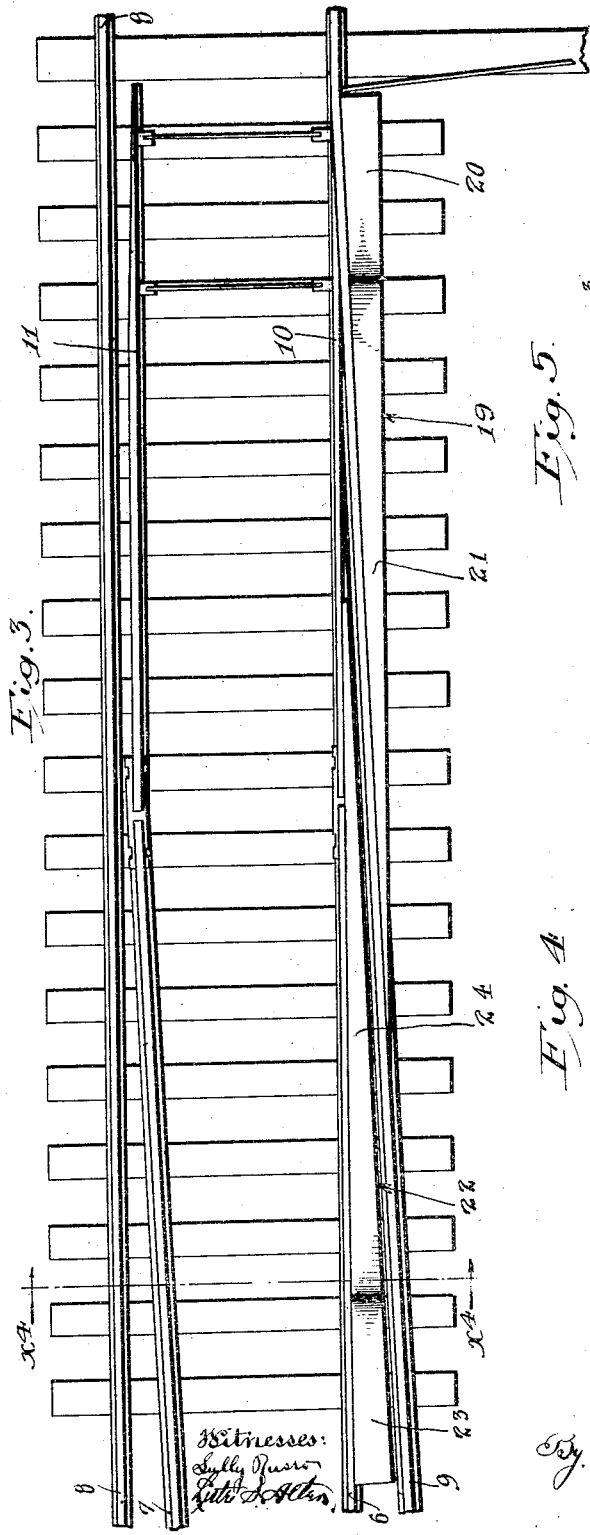
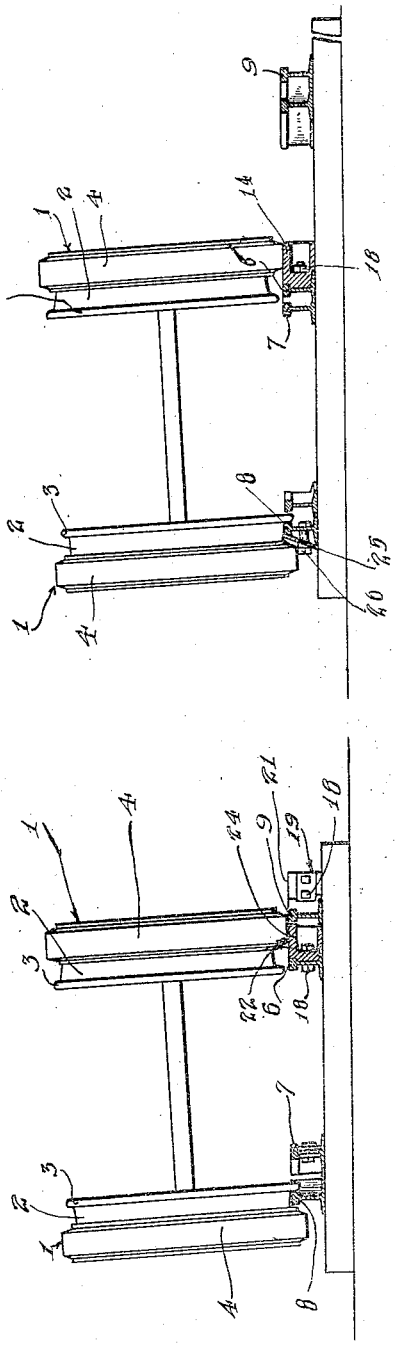
Inventor
William F. Holt.

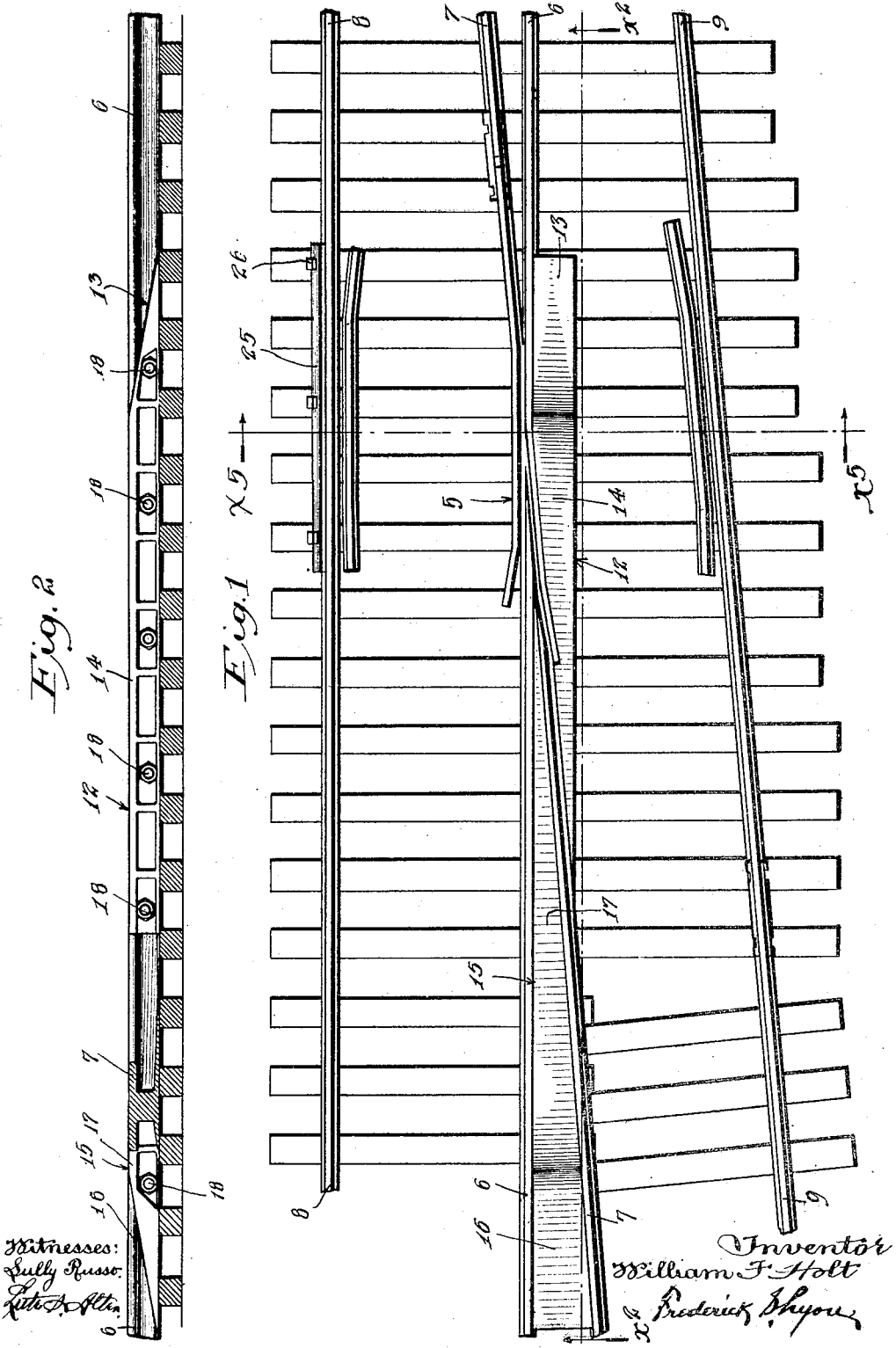

UNITED STATES PATENT OFFICE.

WILLIAM F. HOLT, OF LOS ANGELES, CALIFORNIA.

TRANSPORTATION SYSTEM.

1,246,921.  Specification of Letters Patent.  Patented Nov. 20, 1917.

Application filed July 11, 1917. Serial No. 179,842.

*To all whom it may concern:*

Be it known that I, WILLIAM F. HOLT, a citizen of the United States, residing at Los Angeles, in the county of Los Angeles, and State of California, have invented a new and useful Transportation System, of which the following is a specification.

This invention pertains to the construction of the tracks of a railroad system designed for coöperation with auto vehicles having wheels with rail treads and road treads, and an object of the invention is to facilitate the operation of such vehicles through the switches of the railroad track.

Another object is to produce a construction of this character which will not interfere with the operation of ordinary car wheels on the track.

Another object is to produce a construction of this character which is substantial and not liable to become disarranged.

Other objects and advantages will appear in the subjoined detail description.

The accompanying drawings illustrate the invention:

Figure 1 is a plan view of a portion of a switch built in accordance with this invention.

Fig. 2 is an elevation partly in section on line indicated by $x^2$—$x^2$, Fig. 1.

Fig. 3 is a plan view of another portion of a switch built in accordance with this invention.

Fig. 4 is a sectional elevation on line indicated by $x^4$—$x^4$, Fig. 3, the wheels and axle of a vehicle also being shown.

Fig. 5 is a sectional elevation on line indicated by $x^5$—$x^5$, Fig. 1, the wheels and axle of a vehicle also being shown.

Wheels of a type designed to operate on the rails of this improved transportation system are indicated in general by the character 1, Fig. 4. These wheels have rail treads 2 provided with flanges 3 and said wheels also have road treads 4 which are preferably resilient. The wheels 1 may be of any desired construction, and those shown in Fig. 4 of the drawings are analogous to those shown in my copending application for a patent for a wheel.

Figs. 1 and 3 show a switch fragmentarily in plan view, Fig. 1 being the intersecting portions of two tracks forming the frog 5 of the switch and Fig. 3 being the switch blade portion of the switch, the portion between the switch blade portion and frog portion being omitted because of the necessity to contract the view.

The frog portion 5 of the switch is located at the intersection of the adjacent rails 6, 7 of the respective tracks, the outer rails of said tracks being respectively indicated at 8, 9.

For facilitating the description of the invention, it may be assumed that the rails 6, 8 constitute the main line and the rails 7, 9 constitute a branch line, although it is clear that the rails 7, 9 could as readily constitute the main line and the rails 6, 8 the branch line.

The rails 6, 7 terminate in switch blades 10, 11 respectively, and said switch blades may be operated by any suitable mechanism which it is not necessary to show and describe in detail herein since it forms no part of this present invention.

Extending along the rail 6, adjacent the frog 5 is a road tread plate 12. This plate terminates at one end in an inclined portion 13 and has the upper surface of another portion flush with the tops of the rails as at 14. Also extending from adjacent the frog to beyond the flush portion 14 of the plate is another road tread plate 15 terminating in an inclined portion 16. The portion of the plate 15 extending from the inclined portion 16 to adjacent the frog 5 has its upper face flush with the tops of the rails 6, 7 as at 17. It is understood that the plates 12, 15 may be of any suitable construction, cast, rolled or forged and may be made integral with the frog 5 or of separate construction. In the drawings they are shown as of separate construction fastened by bolts 18 to the rails 6, 7.

Extending along the rail 9 opposite the switch blade 10 is a road tread plate 19 having an inclined portion 20, the portion of the plate 19 that extends from the inclined end 20 to the opposite end having its upper face 21 flush with the top of the rail 9. This plate may be of integral construction with the rail 9 or fastened thereto by means similar to those described above for the plates 12, 15. Extending along the outside of the rail 6 between said rail and the rail 9 is a road tread plate 22 having an inclined portion 23, the upper face of the portion of said plate that extends from the inclined portion 23 to the opposite end of the plate being flush with the top of the rail 9 as at 24. The plate 22 may be formed integral with either of the rails 6 or 9 or both, or may be of separate construction and fastened in place the same as described above for the plates 12, 15.

Opposite the frog 5 at the outer side of the outer rail 8 is a downwardly and outwardly inclined plate 25. This plate 25 may be formed integral with the rail 8 or may be of separate construction and fastened in place by bolts 26 passing through the plate 25 and rail 8.

The plate 25 has its upper edge flush with the tops of the rails and seated against said rails.

The foregoing described construction is designed to be used in connection with a transportation system such as disclosed in my prior patent for transportation system, No. 1,212,487, dated January 16, 1917, the wheels of the vehicle in said system being provided with rail treads and road treads so that the vehicle can be readily operated, without change of the wheel components, on a railroad track and also on an ordinary roadway.

In practice, assuming that the switch is set in the position shown in Fig. 3 of the drawings and that the wheels 1 are running from right to left in Figs. 1 and 3, it is clear that the road tread 4 of the wheel on the rail 6 will run up the inclined plate portion 20 and will travel along the flat face 21 of the plate 19, thence onto the top of the rail 9, thence onto the plate 22 and finally down the inclined plate portion 23 so that the road tread 4 of the wheel will not be interfered with by the rail 9 when the wheels are passing through the switch.

The wheel will then pass along the rail 6 with the track tread 2 in contact with the rail until the inclined portion 13 is reached. The road tread 4 will then travel up the inclined portion 13, thence onto the flat portion 14 of the plate 12, thence over the rail 7 onto the flat portion 17 of the plate 15 and thence down the inclined portion 16, thus bringing the track tread 2 into engagement with the rail 6.

The wheels are prevented from shifting sidewise, when the track tread 2 of the one wheel is raised from engagement with the rail 6, by reason of the flange 3 and tread 4 of the other wheel engaging the rail 6 and plate 25 respectively.

When the vehicle passes from left to right the operation of the inclined portions of the plates will be the reverse of those described above.

I claim:

1. In a transportation system, a wheel having track and road treads, intersecting rails to receive the wheel, and means for the road tread to run upon at the intersection to raise the road tread sufficiently to allow it to pass from one rail over the other rail.

2. In a transportation system, wheels having track and road treads, intersecting tracks to receive the wheels, and plates along one of the rails of one track adjacent the intersection of said rails provided with inclined ends and having other portions flush with the tops of the rails.

3. In a transportation system, a wheel having track and road treads, main line and branch line rails, a switch blade for the branch line rail movable toward and from the other rail, and means for the road tread of the wheel to run upon, adjacent the switch blade, to raise the road tread sufficiently to allow it to pass from the main line rail over the branch line rail.

4. In a transportation system, wheels having track and road treads, main line and branch line tracks intersecting one another to form a switch, the rails of one of said tracks being provided with switch blades movable toward and from the rails of the other track, means for the road tread of the wheel on one of the main line rails to run upon, adjacent the switch blade, to raise the wheel sufficiently to allow the road tread thereof to pass from the main line rail across the adjacent branch line rail, and means for said road tread to run upon at the intersection of one of the main line rails and one of the branch line rails to raise the wheel sufficiently to allow the road tread thereof to pass from said main line rail across the branch line rail.

5. In a transportation system, wheels having track and road treads, intersecting tracks to receive the wheels, means for the road tread to run upon, adjacent the intersection, to raise the road tread of the wheel running on one rail sufficiently to allow it to pass from said rail across the other intersecting rail, and means adapted to engage the road tread of the other wheel to prevent sidewise movement of said wheel when the track tread of the first named wheel is raised out of engagement with its rail.

6. In a transportation system, wheels having track and road treads, intersecting tracks to receive the wheels, plates adjacent one of the rails of one track provided with inclined ends and provided with other portions flush with the top of said rail, and a downwardly and outwardly inclined plate adjacent the other rail of said last named track adapted to engage the road tread of the wheel on said other rail to prevent sidewise movement of said wheel.

Signed at Los Angeles, California, this 6th day of July, 1917.

WILLIAM F. HOLT.

Witnesses:
GEORGE H. HILES,
L. BELLE WEAVER.

Copies of this patent may be obtained for five cents each, by addressing the "Commissioner of Patents, Washington, D. C."